United States Patent
Lambert et al.

(12) 
(10) Patent No.: US 6,229,234 B1
(45) Date of Patent: May 8, 2001

(54) ROTATING ELECTRIC MOTOR SYSTEM CAPABLE OF VIBRATING AND METHOD FOR OPERATING A ROTATING ELECTRIC MOTOR CAPABLE OF VIBRATING

(75) Inventors: Ghislain Lambert, Beloeil; Christian Pronovost, Longueuil; Bruno Francoeur, Beloeil; Pierre Couture, Boucherville, all of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/445,805

(22) PCT Filed: Jun. 10, 1998

(86) PCT No.: PCT/CA98/00483

§ 371 Date: Dec. 14, 1999

§ 102(e) Date: Dec. 14, 1999

(87) PCT Pub. No.: WO98/58446

PCT Pub. Date: Dec. 23, 1998

(30) Foreign Application Priority Data

Jun. 16, 1997 (CA) .................................................. 2208499

(51) Int. Cl.$^7$ ........................... H02K 7/06; H02K 33/00; G01C 17/38
(52) U.S. Cl. ................................ 310/81; 73/660; 318/114
(58) Field of Search ........................ 310/81, 152; 73/660, 73/662, 669, 670, 672; 81/463; 318/114, 119, 121, 126, 128

(56) References Cited

U.S. PATENT DOCUMENTS

| | | | |
|---|---|---|---|
| 3,677,077 | 7/1972 | Merryman et al. | 73/146 |
| 3,844,175 | 10/1974 | Hixson | 73/557 |
| 3,913,084 | 10/1975 | Bollinger et al. | 340/261 |

(List continued on next page.)

FOREIGN PATENT DOCUMENTS

| | | |
|---|---|---|
| 41 04 961 | 8/1992 | (DE) . |
| 195 31 402 | 2/1997 | (DE) . |
| 0 671 620 | 9/1995 | (EP) . |
| 2 197 473 | 5/1988 | (GB) . |
| 2 201 777 | 9/1988 | (GB) . |
| 56-6181 | 1/1981 | (JP) . |
| 57-538 | 1/1982 | (JP) . |
| 63-88410 | 4/1988 | (JP) . |
| 63-138230 | 6/1988 | (JP) . |
| 1-180425 | 7/1989 | (JP) . |
| 2-79800 | 3/1990 | (JP) . |
| 3-68834 | 3/1991 | (JP) . |
| 8-137555 | 5/1996 | (JP) . |
| 241803 | 4/1969 | (RU) . |
| 368540 | 9/1973 | (RU) . |

OTHER PUBLICATIONS

The Soviet Journal of Nondestructive Testing (Trans. Of Defektoskopiya), vol. 10, No. 3, pp. 301–307, May–Jun., 1974 (publ. Mar. 1975).

*Primary Examiner*—Nestor Ramirez
*Assistant Examiner*—Dang Dinh Le
(74) *Attorney, Agent, or Firm*—Foley & Lardner

(57) ABSTRACT

The invention concerns a rotating electric motor system capable of vibrating and a method for operating a rotary electric motor capable of vibrating. The system comprises an electric motor having a rotor and the stator, the rotor and the stator forming a unit vibrating within an audio frequency range; a power amplifier powering the electric motor, the power amplifier having a passband including at least the audio frequency range; and a signal generator generating the signal controlling the power amplifier. The signal generator comprises at least the audio frequency range. The control signal has a continuous component for rotating the rotor with respect to the stator, and an alternating component for inducing mechanical vibration in the unit capable of vibrating.

3 Claims, 8 Drawing Sheets

U.S. PATENT DOCUMENTS

| | | | |
|---|---|---|---|
| 4,327,518 | 5/1982 | Knauff | 46/228 |
| 4,377,947 | 3/1983 | Matsushita et al. | 73/593 |
| 4,402,527 | 9/1983 | Kakehi et al. | 280/707 |
| 4,522,347 | 6/1985 | Swisher | 242/84.5 |
| 4,564,727 | 1/1986 | Danley et al. | 179/116 |
| 4,793,186 | 12/1988 | Hurley | 73/650 |
| 4,884,449 | 12/1989 | Nishimoto | 73/660 |
| 4,913,084 | 4/1990 | Seymour | 118/123 |
| 4,970,909 | 11/1990 | Pelzer | 74/443 |
| 4,988,979 | 1/1991 | Sasaki et al. | 340/683 |
| 4,997,404 | 3/1991 | May | 446/409 |
| 5,029,477 | 7/1991 | Bambara | 73/660 |
| 5,062,296 | 11/1991 | Migliori | 73/579 |
| 5,109,715 | 5/1992 | Christian et al. | 73/865.9 |
| 5,191,618 | 3/1993 | Hisey | 381/158 |
| 5,216,921 | 6/1993 | Tsuboi | 73/579 |
| 5,245,664 | 9/1993 | Kinoshite et al. | 381/71 |
| 5,265,831 | 11/1993 | Muller | 246/124 |
| 5,297,757 | 3/1994 | Johansson et al. | 242/306 |
| 5,748,748 | 5/1998 | Fischer et al. | 381/71.4 |
| 5,903,077 | * 5/1999 | Garnjost et al. | 310/81 |

\* cited by examiner

ROTATING ELECTRIC MOTOR SYSTEM CAPABLE OF VIBRATING AND METHOD FOR OPERATING A ROTATING ELECTRIC MOTOR CAPABLE OF VIBRATING

FIELD OF THE INVENTION

The present invention relates to a rotating electric motor system capable of vibrating and a method for operating a rotating electric motor capable of vibrating having a rotor and a stator. The rotor and the stator forming a unit capable of vibrating, which allows mechanical vibrations.

There is in the prior art Japanese document 08 137555 A (Shinko Electric Co. Ltd) of May 31, 1996. This document proposes a vibration control system for a motor instead of vibration control systems of the prior art that need the use of an oil pressure vibrator. The control of the motor is done by a first control loop, i.e. a speed control loop. The document also proposes a second control loop, i.e. a vibration control loop. Finally, the document clarifies that the frequency response of the speed control loop is set to a relatively low value with respect to signal F which controls the vibration frequency. Therefore, the motor is controlled by the first loop for rotating at speed N, and controlled by the second loop for vibrating at frequency F according to an amplitude ΔN.

PRIOR ART

There is in the prior art U.S. Pat. No. 5,191,618 from HISEY, Bradner L. wherein is described a rotating apparatus for reproducing low frequency signals and a method. The apparatus comprises a rotary acoustic radiator comprising an enclosure having a cylindrical side wall and end walls forming a cylindrical chamber. A motor is provided for rotating a rotor according to a rotary and alternating movement. The apparatus described in that patent is capable of reproducing sounds with very little distortion from a frequency of 80 Hertz to a lower frequency of around 20 Hertz within the audible frequency range.

There is also in the prior art Japanese patent No. 63-138230 describing a vibration analyzing device for automobile. The purpose of that invention is to evaluate the components of an automobile by submitting it to vibrations. To achieve such an evaluation, the front and back wheels of the automobile are placed on rollers and the automobile is run. A vibration signal is detected and analyzed, allowing the evaluation of the components of the automobile.

There is also in the prior art U.S. Pat. No. 3,677,077 from MERRYMAN, George B. describing an evaluation system of vibrations for evaluating the different vibrations of a moving vehicle. That system is characterized by a plurality of electric winding conductors. Currents are measured in the conductors and give an indication of the amplitude of the vibrations of the vehicle.

There is also in the prior art U.S. Pat. No. 4,988,979 from SASAKI, Hiroaki et al. describing an inspection system of rotating machines. First, the rotation speed wherein a physical parameter linked to the rotating machine is detected and a first corresponding signal is produced. Next, a sound pressure or a mechanical vibration produced by the rotating machine is detected and a second corresponding signal is produced. From those two signals, an evaluation of the rotating machine is performed.

The following patents and documents are also known in the prior art:
U.S. Pat. Nos.:
 4,327,518
 4,522,347
 4,564,727
 4,970,909
 4,997,404
 5,109,715
 5,191,618
 5,297,757
 3,677,077
 3,844,175
 3,913,084
 4,377,947
 4,402,527
 4,793,186
 4,884,449
 4,913,084
 4,988,979
 5,029,477
 5,062,296
 5,216,921
 5,245,664
 5,265,831
Publication:
 The Soviet Journal of Nondestructive Testing (Trans. of Defektoskopiya), Vol. 10, No. 3, pages 301–307, May–June, 1974 (publ. March 1975)
Japanese patent Nos.:
 63-138230
 1-180425
 3-68834
 56-6181
 57-538
 63-088410
UK patent No.:
 2,201,777
Russian patent Nos.:
 241,803
 368,540

None of the above-mentioned patents or documents proposes a rotating machine nor a method for operating a rotating machine capable of vibrating wherein the machine can vibrate within an audible frequency range independent from whether it is rotating or not.

An object of the present invention is to provide a rotating electric motor system capable of vibrating and a method for operating a rotating electric motor capable of vibrating wherein the electric motor can vibrate within an audible frequency range independent from whether it is rotating or not.

According to the present invention, there is provided a rotating electric motor system capable of vibrating comprising:
 an electric motor having a rotor and a stator, the rotor and the stator forming a unit capable of vibrating having a first passband allowing mechanical vibrations within an audible frequency range;
 a power amplifier for powering the electric motor, having a power output connected to the electric motor and a control signal input for receiving a control signal, the power amplifier having a second passband including at least the first passband; and a signal generator for generating the control signal, the signal generator having a third passband comprising at least the first passband, the control signal having a continuous component for rotating the rotor with respect to the stator, and an alternating component for inducing mechanical vibrations in the unit capable of vibrating.

According to the present invention, there is also provided a method for operating a rotating electric motor capable of vibrating having a rotor and a stator, the rotor and the stator forming a unit capable of vibrating having a first passband allowing mechanical vibrations, the method comprising the steps of:

(a) producing a control signal having a continuous component for rotating the rotor with respect to the stator, and an alternating component for inducing mechanical vibrations in the unit capable of vibrating within an audible frequency range;

(b) producing a power signal in response to the control signal produced in step (a), for powering the electric motor; and (c) powering the electric motor with the power signal for vibrating the electric motor in response to the alternating component of the control signal and rotating the rotor in response to the continuous component of the control signal.

Other objects, advantages and other characteristics of the present invention will be readily apparent upon reading of the following non restrictive description according to preferred embodiments described with reference to the drawings.

DETAILED DESCRIPTION OF THE FIGURES

Figure 1:
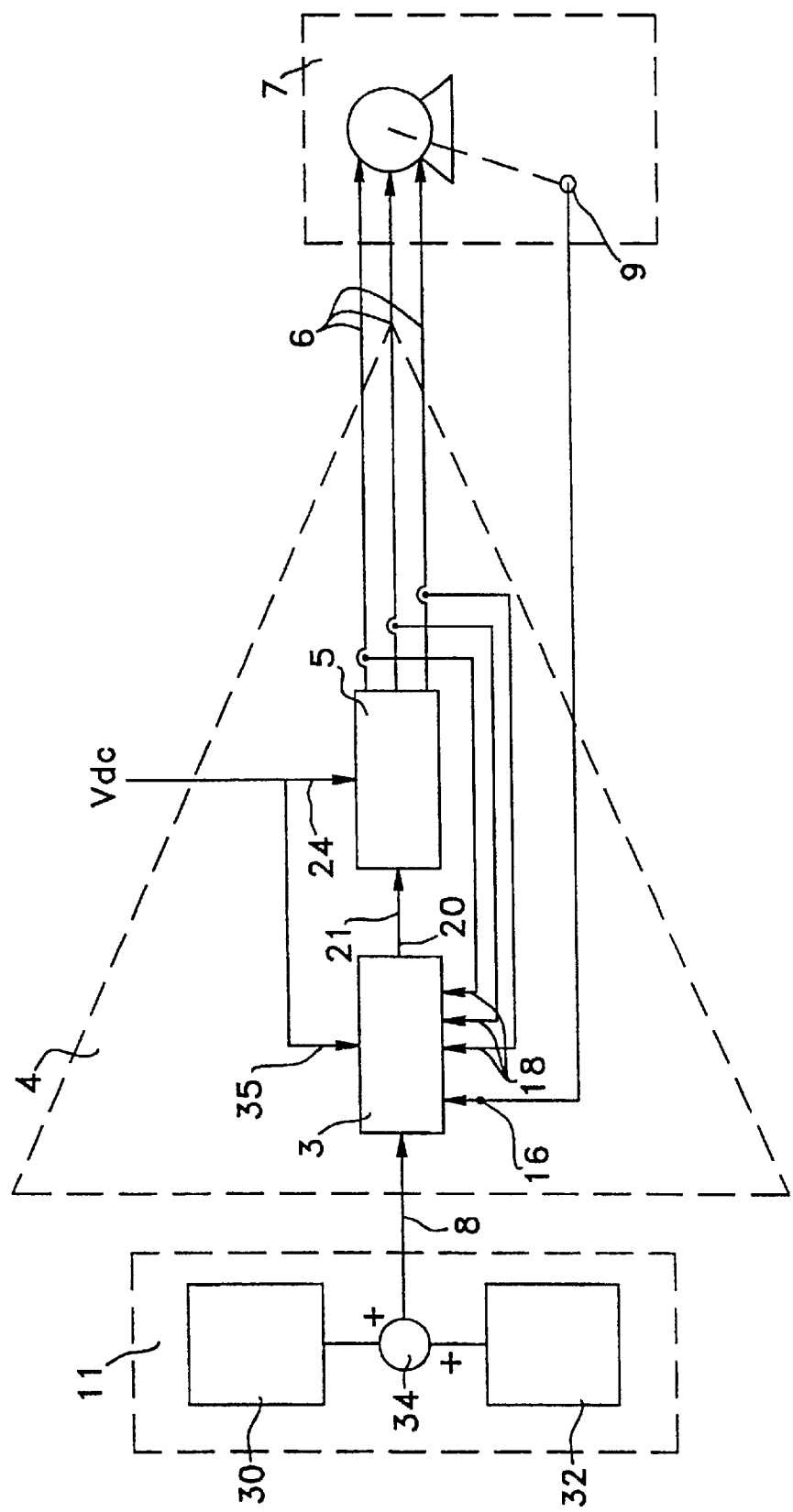
FIG. 1 is a block diagram showing the rotating electric motor system capable of vibrating according to a first embodiment of the present invention.

Referring now to FIG. 1, it is shown a rotating electric motor system capable of vibrating according to the present invention. It comprises an electric motor 7 having a rotor and a stator. The electric motor will be described with more details when making reference to FIGS. 5 and 6. The electric motor is preferably a synchronous electric motor-wheel with permanent magnets. The rotor and the stator form a unit capable of vibrating having a first passband allowing mechanical vibrations within an audible frequency range. A power amplifier 4 is provided for powering the electric motor 7. The power amplifier has a power output 6 connected to the electrical motor 7 and a control signal input 8 for receiving a control signal. The power amplifier 4 has a second passband including at least the first passband.

A signal generator 11 is provided for generating the control signal. The signal generator 11 has a third passband including at least the first passband. The control signal has a continuous component for rotating the rotor with respect to the stator, and an alternating component for inducing mechanical vibrations in the unit capable of vibrating within an audible frequency range. The signal generator 11 comprises an audio signal generator 30 for generating an alternating component for vibrating the unit which comprises the rotor and the stator of the electric motor 7. A command signal generator 32 is also provided for generating a continuous component for inducing a rotation of the rotor with respect to the stator. An adder 34 is provided for adding the output signal of the audio signal generator 30 to the output signal of the command signal generator 32 and producing a control signal applied to the control input 8 of the power amplifier 4.

The power amplifier 4 comprises a current regulator 3 and an inverter 5. The electric motor-wheel 7 is, preferably, a synchronous three-phase machine with permanent magnets.

The output signal of the signal generator 11 is sent to the current regulator 3. The current regulator 3 also receives via its input 16 an encoded signal of the position of the rotor of the machine 7 from the encoder 9, via its inputs 18 three current measurements of the output 6, and via its input 35 the power supply signal Vdc. Each current measurement represents a current flowing in one of the three phases of the synchronous machine 7. Based on the received signals by the current regulator 3 via inputs 8, 16, 18, and 35, it produces variable pulse width modulated signals PWMa, PWMb, and PWMc at its output 20 which are sent to the input 21 of the inverter 5.

It is important to note that the machine 7, the inverter 5, and the current regulator 3 each has a sufficient passband allowing audible frequencies.

Figure 2A:
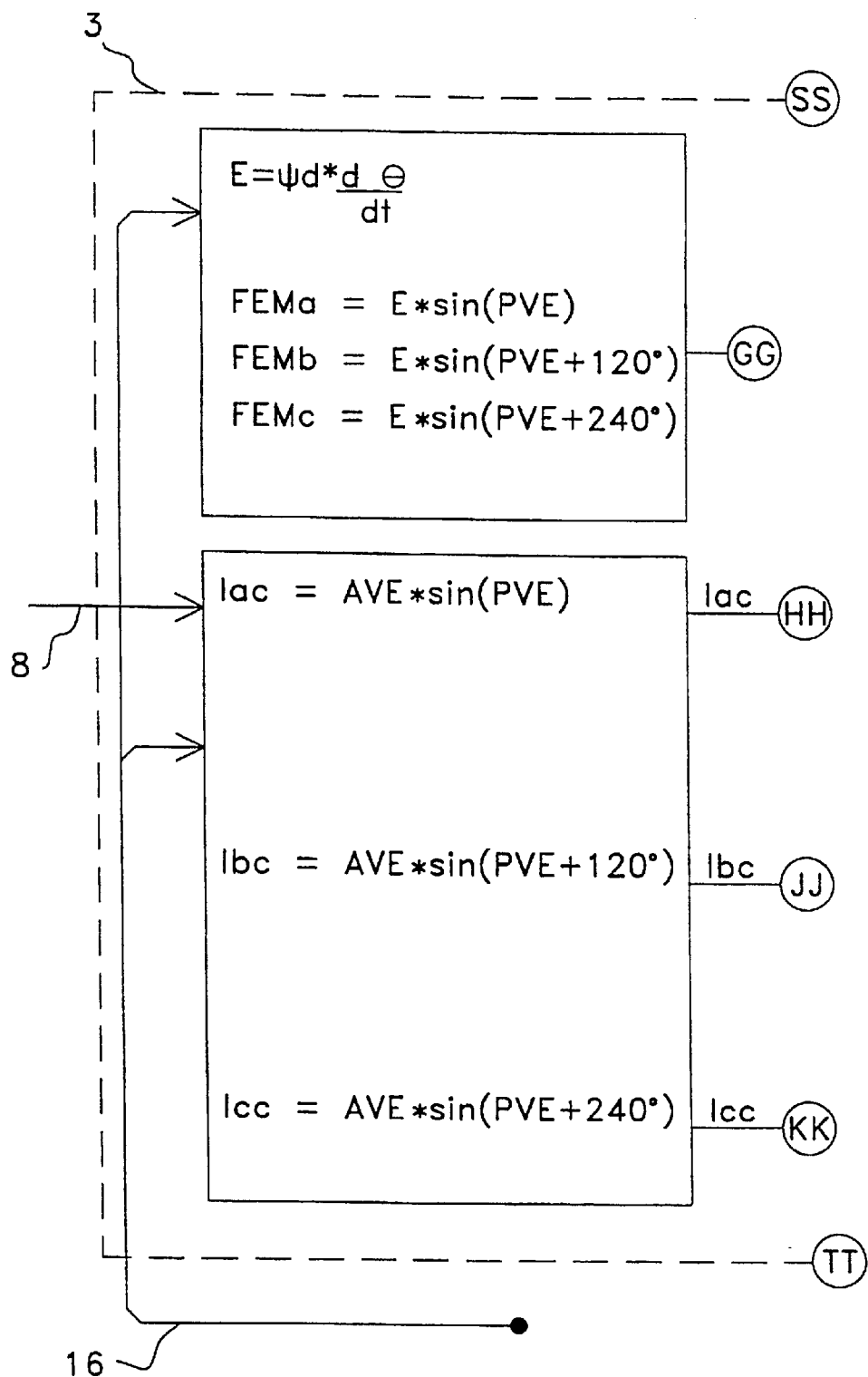
FIG. 2A, 2B, and 2C is a block diagram showing with more details a part of the system shown in FIG. 1.
Figure 2B:
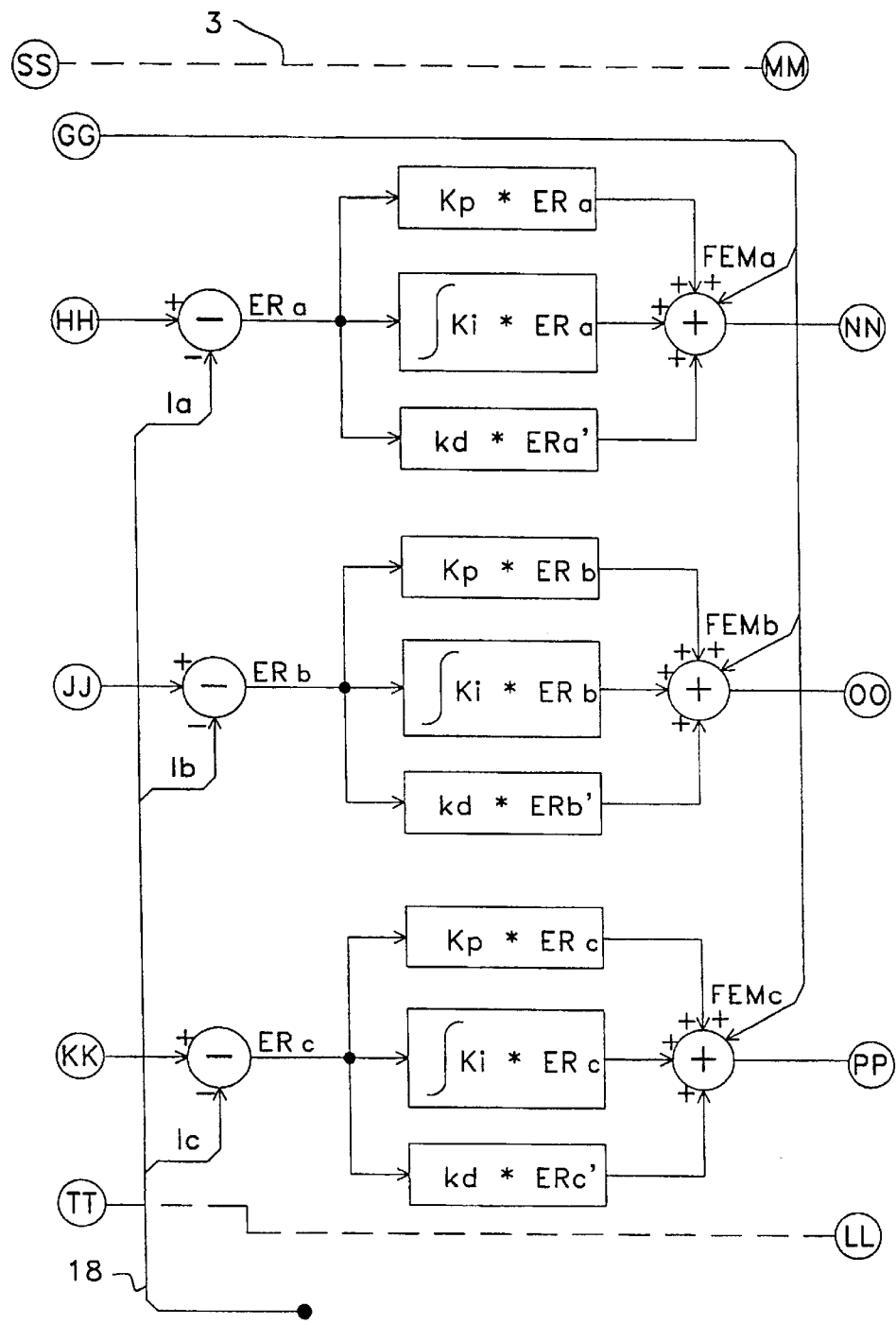
Figure 2C:
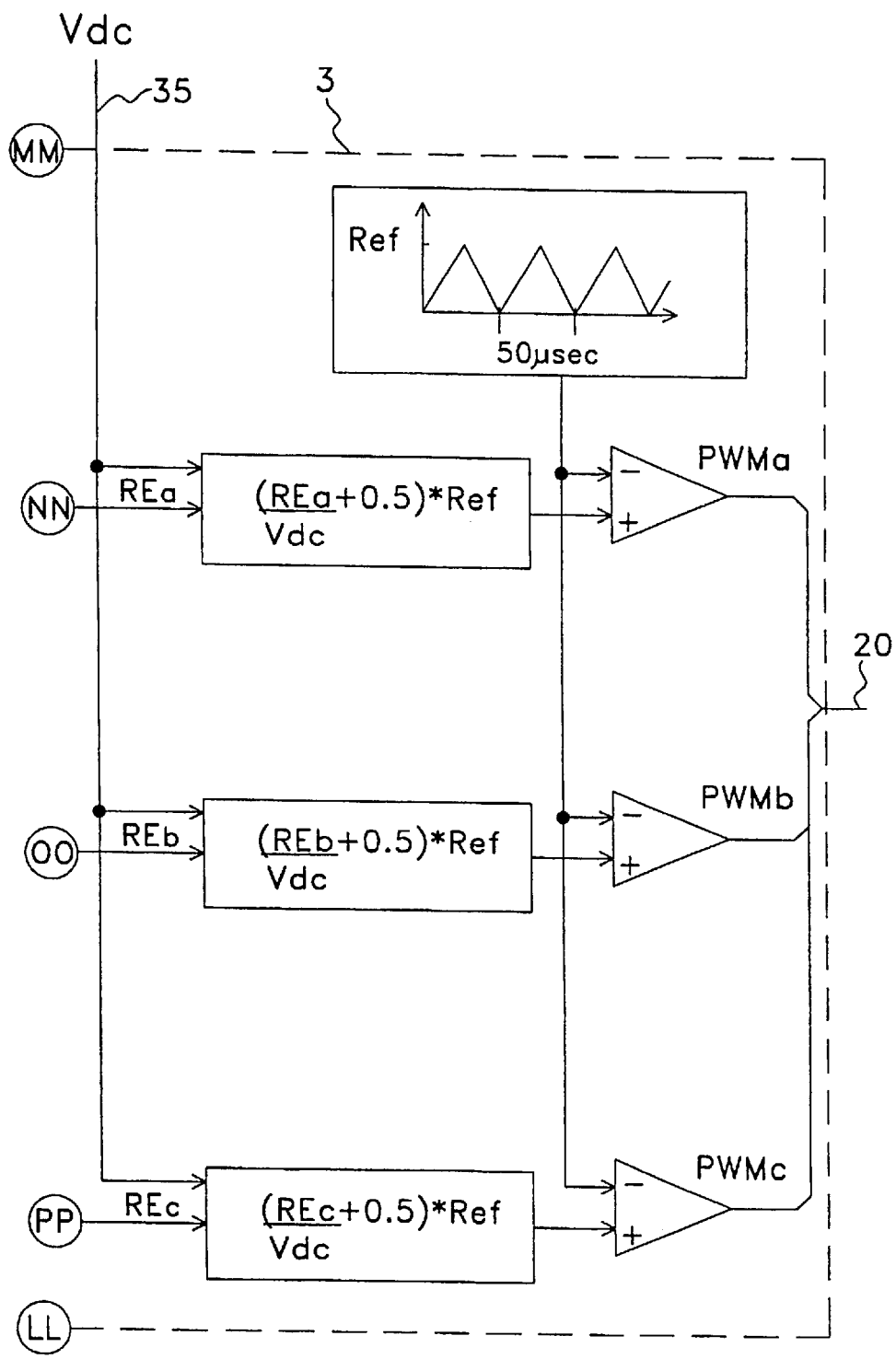

Now referring to FIGS. 2A, 2B, and 2C, it is shown a preferred embodiment of the current regulator 3 for calculating the signals PWMa, PWMb, and PWMc that are applied to the inverter 5 shown in FIG. 1. The command current values Iac, Ibc, and Icc are calculated from the values AVE and PVE derived from inputs 16 and 8. The back electromotive force values FEMa, FEMb, and FEMc are calculated from values PVE, θ, and ψd where ψd is a constant representative of the magnetomotive force. The error values ERa, ERb, and ERc are calculated from the command current values Iac, Ibc, and Icc and from the current values Ia, Ib, and Ic. The values REa, REb, and REc are calculated by means of an PID (Proportional Integral Differential) algorithm which uses the values of FEMa, FEMb, and FEMc. The values PWMa, PWMb, and PWMc are calculated from the values of Vdc, REa, REb, and REc and are applied to the output 20.

Figure 3:
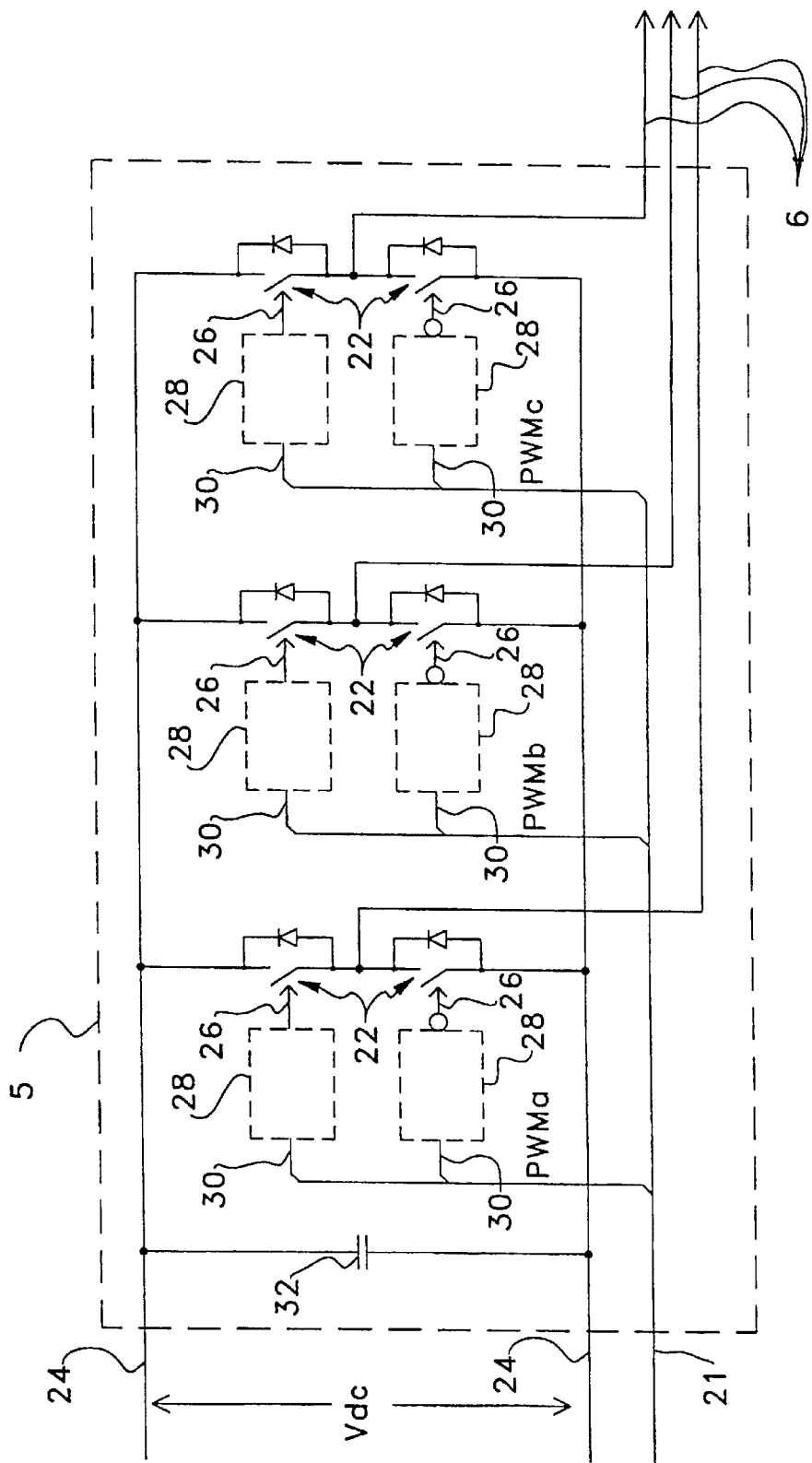
FIG. 3 is a circuit diagram showing with more details another part of the system shown in FIG. 1.

Referring now to FIG. 3, it is shown a preferred embodiment of the inverter 5 shown in FIG. 1. This inverter 5 is used for powering the electric motor 7 shown in FIG. 1 via the outputs 6. Six power switches 22 of the IGBT type are connected to the power supply Vdc via the input 24. The power switches 22 have inputs 26 for receiving the command signals from the outputs of the command circuits 28. The command circuits 28 have inputs 30 for receiving respectively the signals PWMa, PWMb, and PWMc via input 21. A power capacitor 32 is connected in parallel to the input 24 for filtering the power supply Vdc, and is used as a decoupling from the inverter 5.

Returning now to FIG. 1, the inverter 5 receives signals PWMa, PWMb, and PWMc and amplifies them. Three power signals are sent to the machine 7 via the outputs 6 for inducing a rotation and a vibration of machine 7 according to the signals transmitted respectively by the generators 32 and 30. Therefore, it is possible for example to hear the operation of the machine 7 by combining an audible frequency signal with a command signal via the adder 34.

The method for operating the rotating electric motor capable of vibrating 7 comprises the steps of (a) producing a control signal having a continuous component for rotating the rotor with respect to the stator, and an alternating component for inducing mechanical vibrations within an audible frequency range in the unit comprising the rotor and the stator of the electric motor; (b) producing a power signal in response to the control signal produced in step (a), for powering the electric motor 7; and (c) powering the electric motor 7 with the power signal. Therefore, in use, the electric motor vibrates in response to the alternating component of the control signal and the rotor rotates in response to the continuous component of the control signal.

Figure 4:
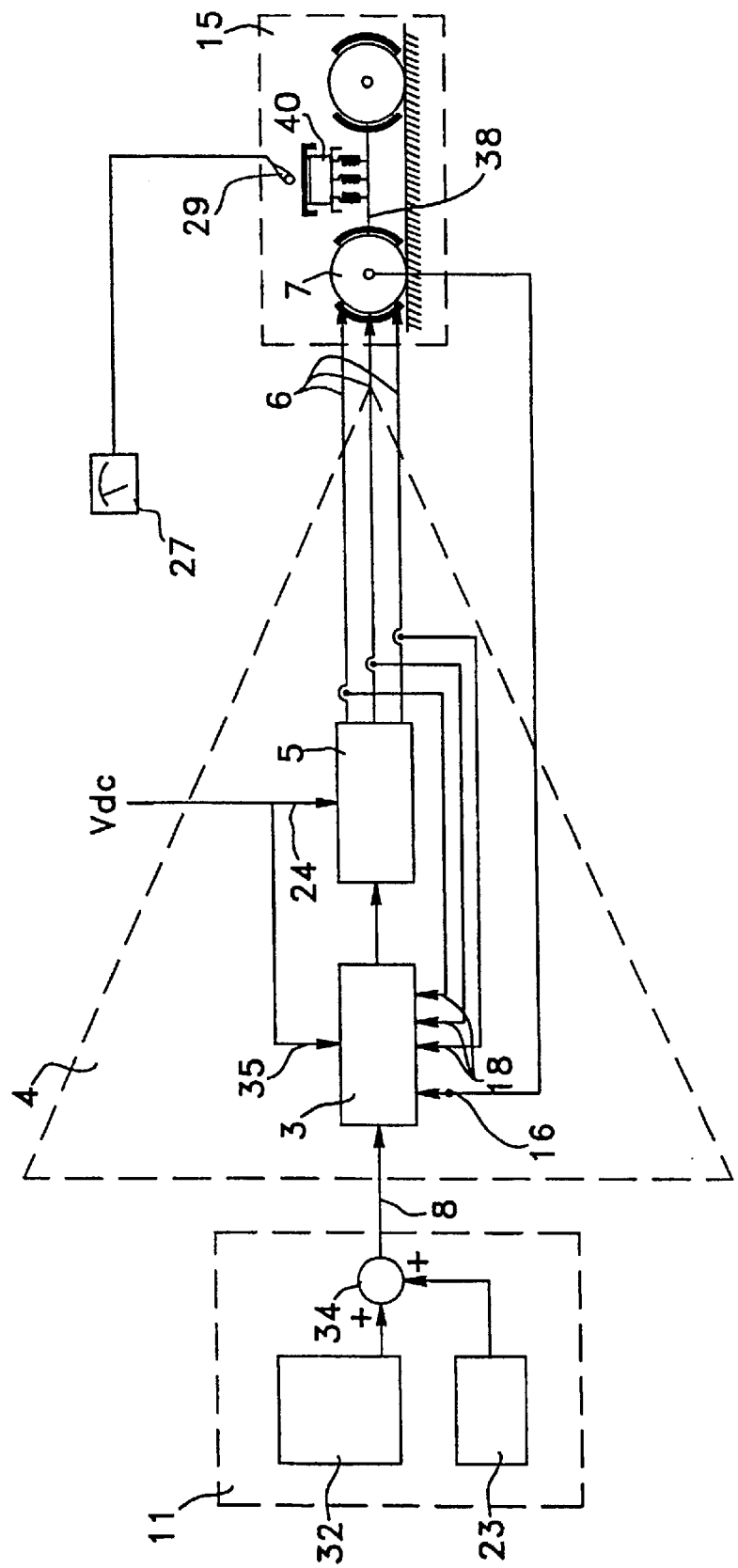
FIG. 4 is a block diagram showing a rotating electric motor system capable of vibrating according to a second embodiment of the present invention.

Referring now to FIG. 4, it is shown a second embodiment of the invention concerning an apparatus and a method for locating a noise caused by an undesired vibration problem in an electric motor-wheel 7 or in a vehicle provided with at least one electric motor-wheel 7. In FIG. 4, same reference numerals of FIG. 1 are referring to similar elements. Normally, for determining the origin of a noise caused by an undesired vibration problem, the mechanic must perform vibration tests on different parts of the electric motor or vehicle. An object of the second embodiment is to provide a system and method for easily and precisely locating a noise caused by an undesired vibration.

In this embodiment, the signal generator 11 comprises a scanning generator 23 for generating a control signal having a scanning alternating component for achieving a mechanical vibration test on the electric motor 7 or on the armature 40 connected to the electric motor 7. When the test is achieved on the armature 40 connected to the electric motor 7, a mechanic link is of course used for linking the electric motor 7 to the armature 40 so that the mechanical vibration test can be done on the armature. Of course, when dealing with an electric vehicle which is already provided with electric motor-wheels such as the electric motors 7, a person skilled in the art will easily understand that the automobile is already provided with the necessary means for achieving a test according to the present invention wherein the electric motor-wheels are represented by the electric motors 7 and wherein the remaining part of the automobile consists of the armature 40.

The scanning of the frequency signals is done within an audible frequency range with predetermined amplitudes for achieving the mechanical vibration test on the vehicle. The scanning generator 23 generates a scan of frequency signals that are combined with the command signals generated by the command signal generator 32 via the adder 34. Of course, for performing a vibration test, one can see to it that the command signal transmitted by the generator 32 be null. The output signal of the adder 34 powers the current regulator 3 which produces, in turn, variable pulse width modulated signals PWMa, PWMb, and PWMc also commonly called PWM signals that are then sent to the inverter 5 which converts the PWM signals into three-phase signals powering the electric motor 7. A microphone 29 is provided for picking up noises caused by mechanical vibrations generated by the vehicle. The measured noises allow locating the parts of the vehicle causing said noises. The system further comprises a dB measuring apparatus 27 connected to the microphone 29 for indicating the noise level around the vehicle 15.

Note that it is important that the machine 7, the inverter 5, and the current regulator 3 have a sufficiently wide passband for allowing audible frequencies.

The method according to this second embodiment comprises the steps of (a) producing a scan of frequency signals within an audible frequency range with predetermined amplitudes; (b) applying the signals produced in step (a) to the input of an amplifier 4 controlling the electric motor-wheel 7 connected to the vehicle 15; and (c) picking up noises caused by vibrations generated by the vehicle by means of a microphone 29 during the scan of frequency signals for locating parts in the vehicle producing undesired vibrations.

Figure 5:
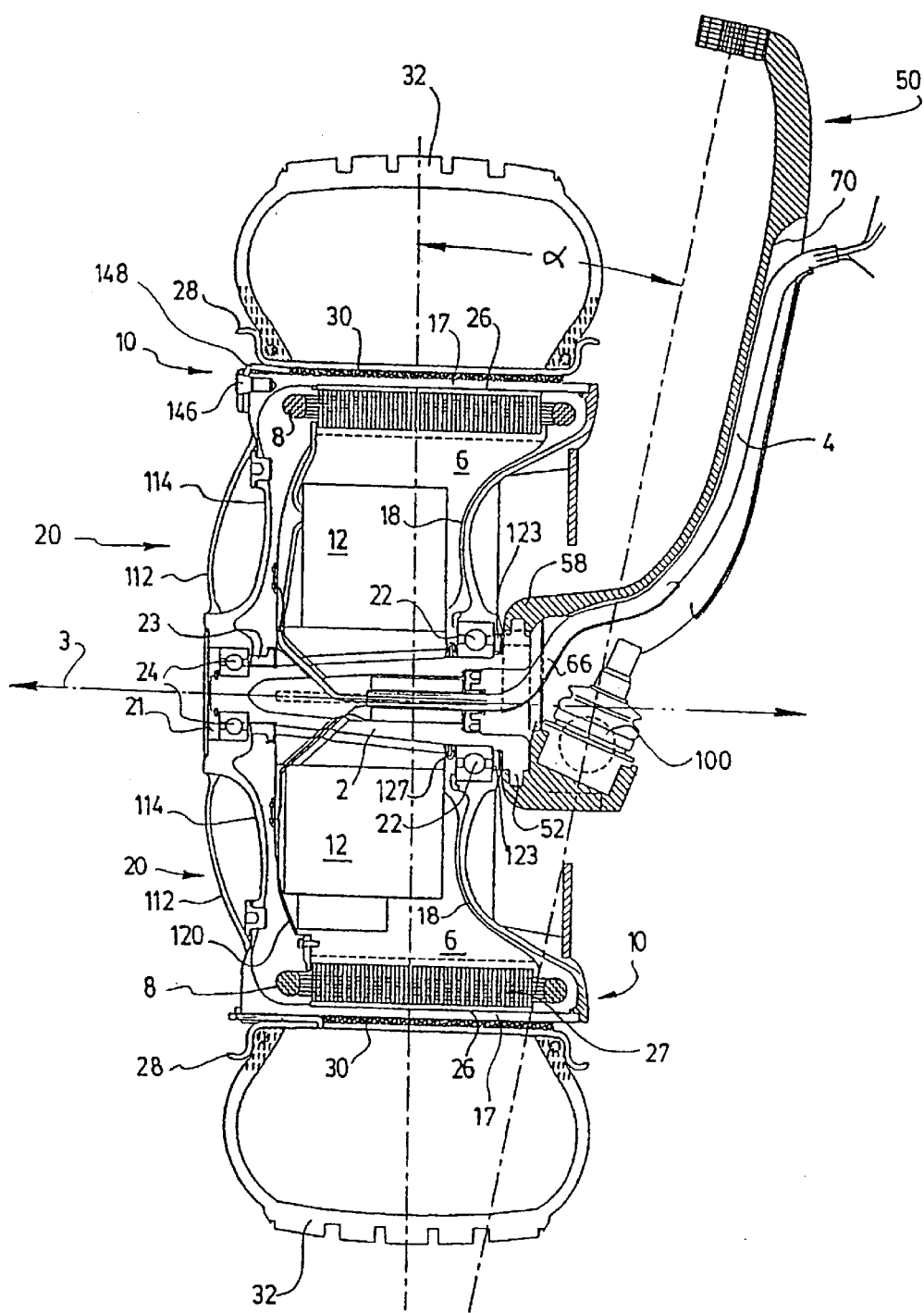
FIG. 5 is a side view partially in cross-section of an electric motor-wheel known in the prior art.
Figure 6:
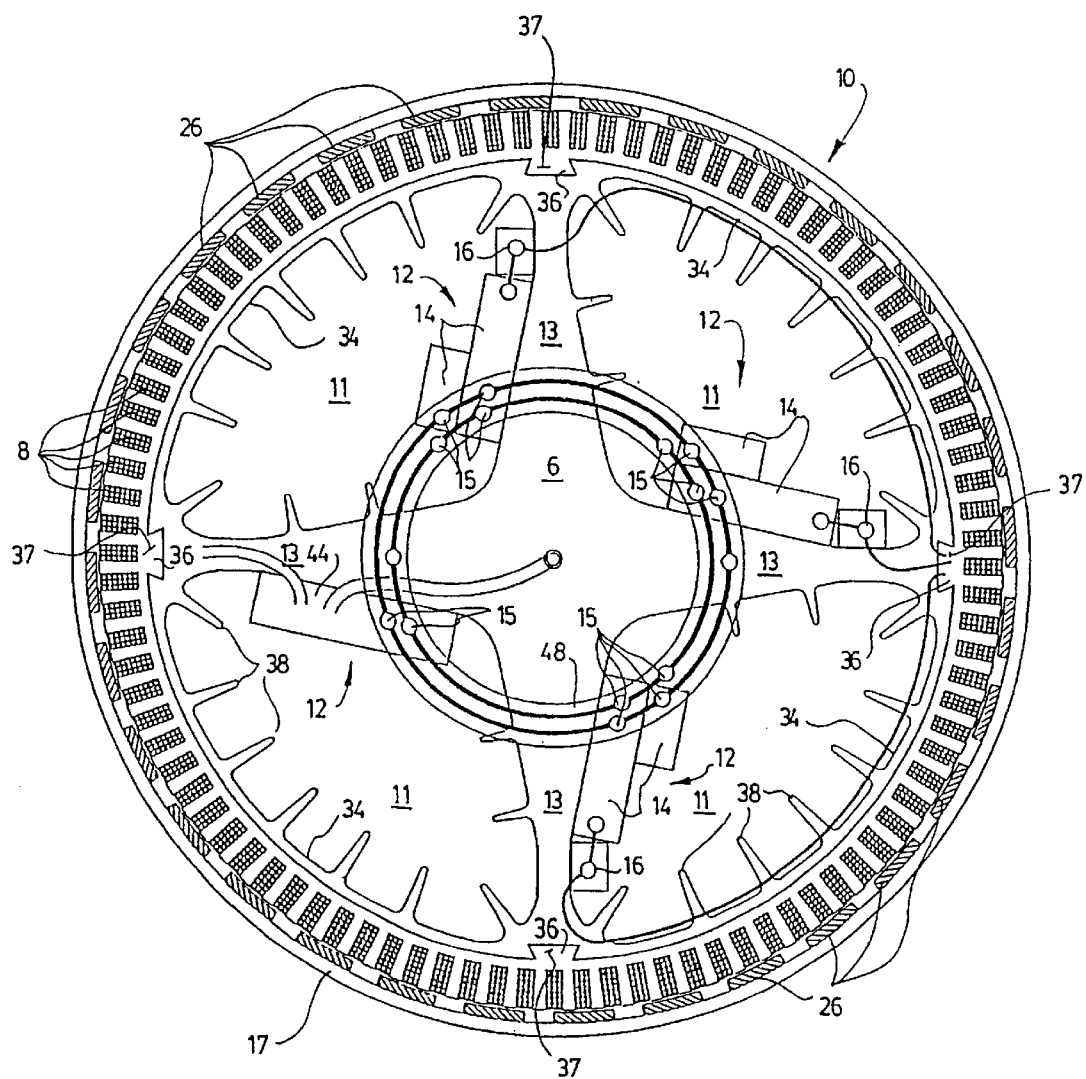
FIG. 6 is a front view partially in cross-section of the rotor and of the stator of the electric motor-wheel shown in FIG. 5.

Referring now to FIGS. 5 and 6, it is shown respectively a side view partially in cross-section of an embodiment of an electric motor-wheel in combination with a rim 28, a tire 32 and a knuckle-jointed connecting rod 50; and a front view partially in cross-section of the rotor 10 and stator 6 of the electric motor-wheel shown in FIG. 5. This motor-wheel is known in the art and is described with more details in the U.S. Pat. No. 5,327,034 from P. Couture et al. The motor-wheel described in this patent relates to, as an example only, a motor that can constitute a unit capable of vibrating according to the present invention because it has a sufficient passband for allowing mechanical vibrations within an audible frequency range. Other electric motors can be used if they permit mechanical vibrations within an audible frequency range.

The electric motor-wheel comprises a hollow shaft 2 having a first opening at one end thereof and a second opening. The first opening receives conductors 4 from outside of the motor-wheel. The stator 6 is coaxial with and fixedly attached to the shaft 2, the stator 6 being provided with hollow portions 11 and coils 8. In FIG. 6, only a few coil sections are indicated by number 8 but it is meant to indicate the coils all around the stator 6.

The rotor 10 is coaxial with the stator 6 and mounted for rotation about the stator 6. The stator 6 comprises openings forming the hollow portions 11 between arms 13 to reduce its weight. The motor-wheel is also provided with a converting system for converting an input electrical current to a variable AC electrical current. The converting system 12 comprises a microprocessor unit 44, a DC/AC converter having power electronics 14 fixedly mounted within the hollow portions 11, input terminals 15 for receiving the input electrical current brought by means of the conductors 4 and output terminals 16 for delivering the variable AC electrical current. The frequency of the variable AC current relates to a desired rotation speed of the rotor 10, the phase angle of the variable AC current determines whether the motor-wheel will operate as a motor or as a generator, and the amplitude of the variable AC current relates to the desired torque.

The stator 6 comprises a central portion attached to the shaft 2, arms 13 extending radially from the central portion, and a peripheral circular pole piece including metallic strips 27 wound with the coils 8. The pole piece is fixed onto peripheral ends of the arms 13.

The rotor 10 comprises a housing having a cylindrical wall 17 having inner surface provided with magnetic means 26 surrounding the stator and separate therefrom by an air gap. As the air gap is relatively small, it cannot be seen in figures 5 and 6. The housing comprises an inner wall 18 on one side of the cylindrical wall 17, and another wall 20 on the other side of the cylindrical wall 17. The shaft 2 extends through the inner wall 18 and centrally thereof. The second opening of said shaft 2 is open on the inside of said housing.

The housing which is integral with the rotor 10 sealingly encloses the shaft 2, the stator 6, and the converting system 12. An airtight joint 123 is provided. The motor-wheel comprises a first ball bearing 22 associated with the inner wall 18, and a second ball bearing 24 associated with the outer wall 20. The ball bearings 22 and 24 are respectively mounted on both sides of the shaft 2 so that the rotor 10 can be rotated with respect to the stator 6 by means of the ball bearings 22 and 24. A threaded bolt 23 is provided for fixing the stator 6 with respect to the shaft 2. A stop ring 21 is also provided. A compressed ring 127 is provided for fixing the ball bearing 22.

In FIG. 6, it can be seen that the stator 6 comprises four equally spaced arms 13. In the embodiment shown in these FIGS. 5 and 6, the magnetic means of the rotor 10 comprises a series of permanent magnets 26. In FIG. 6, only some magnets are identified by number 26 but it has to be understood these magnets 26 are provided all around the stator 6. The stator 6 is partially made of a light weight heat conductive material. Preferably, this material is an aluminum alloy. The motor-wheel further comprises a rim 28 fixed around an outer surface of the housing, and a layer 30 made of elastomer and mounted between the rim 28 and the housing. The rim 28 is adapted to receive the tire 32. The rim 28 is flat. The magnets 26 are made preferably of neodymium, iron and boron. The layer 30 prevents penetration of water or dust between the housing and the rim 28 for preventing an imbalance of the wheel.

The peripheral ends of the arms 13 are fixed onto the pole piece of the stator 6 by means of a circular member 34 which is integral with the peripheral ends of the arms 13. The circular member 34 has its outer surface provided with recesses 36. The circular pole piece of the stator 6 has an inner surface provided with projecting tongues 37 of complementary shape that can be fitted into the recesses 36 for fixing the pole piece of the stator 6 onto the circular member 34. The circular member 34 has an inner surface provided with projections 38, whereby an efficient heat exchange can be obtained by means of the projections 38 when an air circulation is produced inside the housing. Only a few projections are indicated by the number 38 to not overload FIG. 6. The support of the stator 6 and the circular member 34 are made of an aluminum alloy whereas the pole piece of the stator 6 is made of steel.

It has to be noted that the ends of the cross formed by the arms 13 of the stator 6 are aligned with the recesses 36 for mechanical reasons. Thus, the projections 38 that are disposed along said circular member 34 are, in respect of their longitudinal dimension, preferably offset with respect to the axis of the shaft of the motor-wheel, along the circumferential direction of the member 34 to mechanically strengthen it. The central axis 3 is that of the shaft 2.

The annular section 58 has recesses and projections of complementary shape adapted to cooperate with the corresponding projections and recesses of the outer edge of annular member 52. Also, there is provided a key 66 for locking the shaft 2 with respect to the knuckled-jointed connecting rod 50. The knuckled-jointed connecting rod 50 is provided with an inner elongated slot 70 having a first end adjacent to the annular section 58, and a second end removed from the annular section 58, whereby conductors can be brought to the shaft 2 along the elongated slot 70. It can also be seen the ball joint 100.

The outer wall of the housing comprises convex and concave sections 112 and 114 that alternate along circumference direction thereof, in such a manner that, when the rotor is rotating, an air circulation is produced inside the housing by means of the convex section 112, and an air circulation is produced along outside portions of the concave section 114.

An air pipe 120 is provided. It has an end disposed inside the housing. A chamber is disposed at the outer end of the pipe 120 and a desiccating material is disposed inside the chamber. Thus, when the rotor 10 is rotating, an air circulation is produced inside the pipe 120 and through the chamber to dry the air inside the housing.

The tire 32 is fixed to the rim 28 in a permanent manner during the assembly of the motor-wheel. The motor-wheel is provided with a flat rim 28, a first side flange that is welded onto the rim 28, and a second side flange that is fixed onto the rim 28 by means of bolts 146 and an L-shaped member 148 welded onto the rim 28.

What is claimed is:

1. A rotating electric motor system capable of vibrating comprising:
   an electric motor (7) having a rotor and a stator, the rotor and the stator forming a unit capable of vibrating;
   a power amplifier (4) for powering the electric motor (7), having a power output (6) connected to the electric motor (7) and a control signal input (8) for receiving a control signal; and
   a signal generator (11) for generating the control signal, the control signal having a continuous component for rotating the rotor with respect to the stator, and an alternating component for vibrating the electric motor (7);
   wherein the unit capable of vibrating has a first passband allowing mechanical vibrations within an audible frequency range, the power amplifier (4) and the signal generator (11) have respective passbands including the first passband, the electric motor (7) is a synchronous electric motor-wheel with permanent magnets for a vehicle, and the power amplifier (4) comprises a current regulator (3) and an inverter (5).

2. A system according to claim 1, wherein the signal generator comprises a scanning generator (23) for generating a control signal including a scan of frequency signals within the audible frequency range with predetermined amplitudes for producing a mechanical vibration test on the vehicle.

3. A system according to claim 2, further comprising a microphone (29) for picking up a noise produced by the vehicle for locating parts of the vehicle causing said noise.

* * * * *